United States Patent Office 3,340,850
Patented Sept. 12, 1967

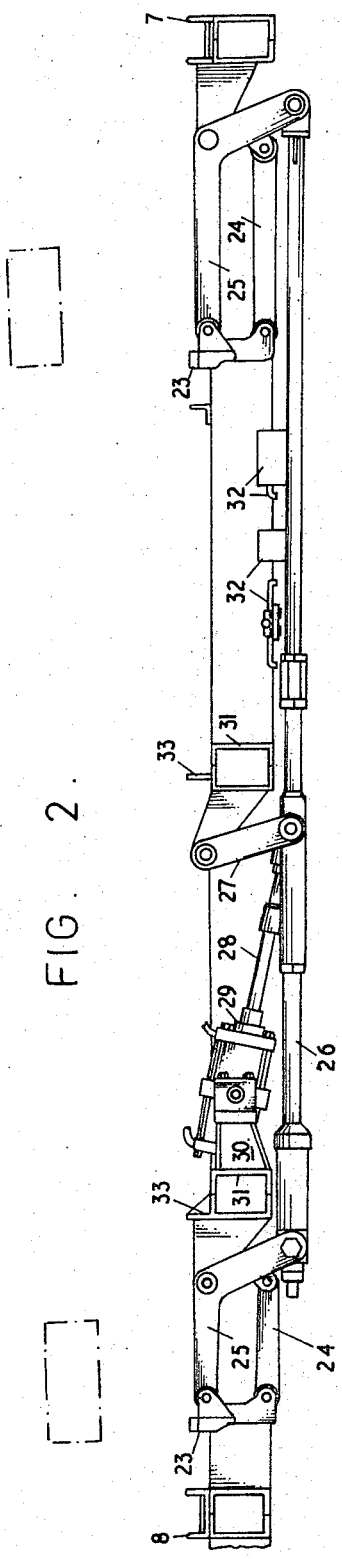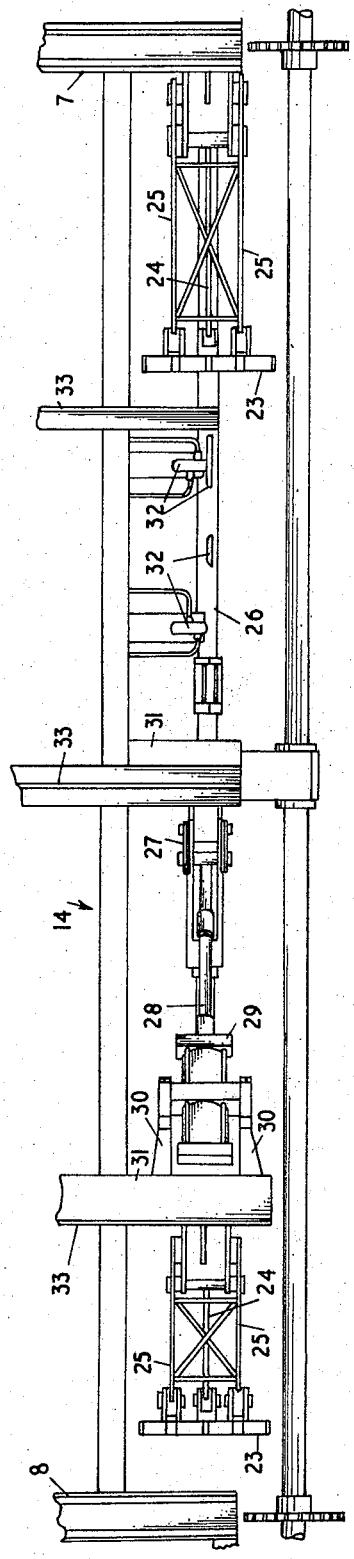

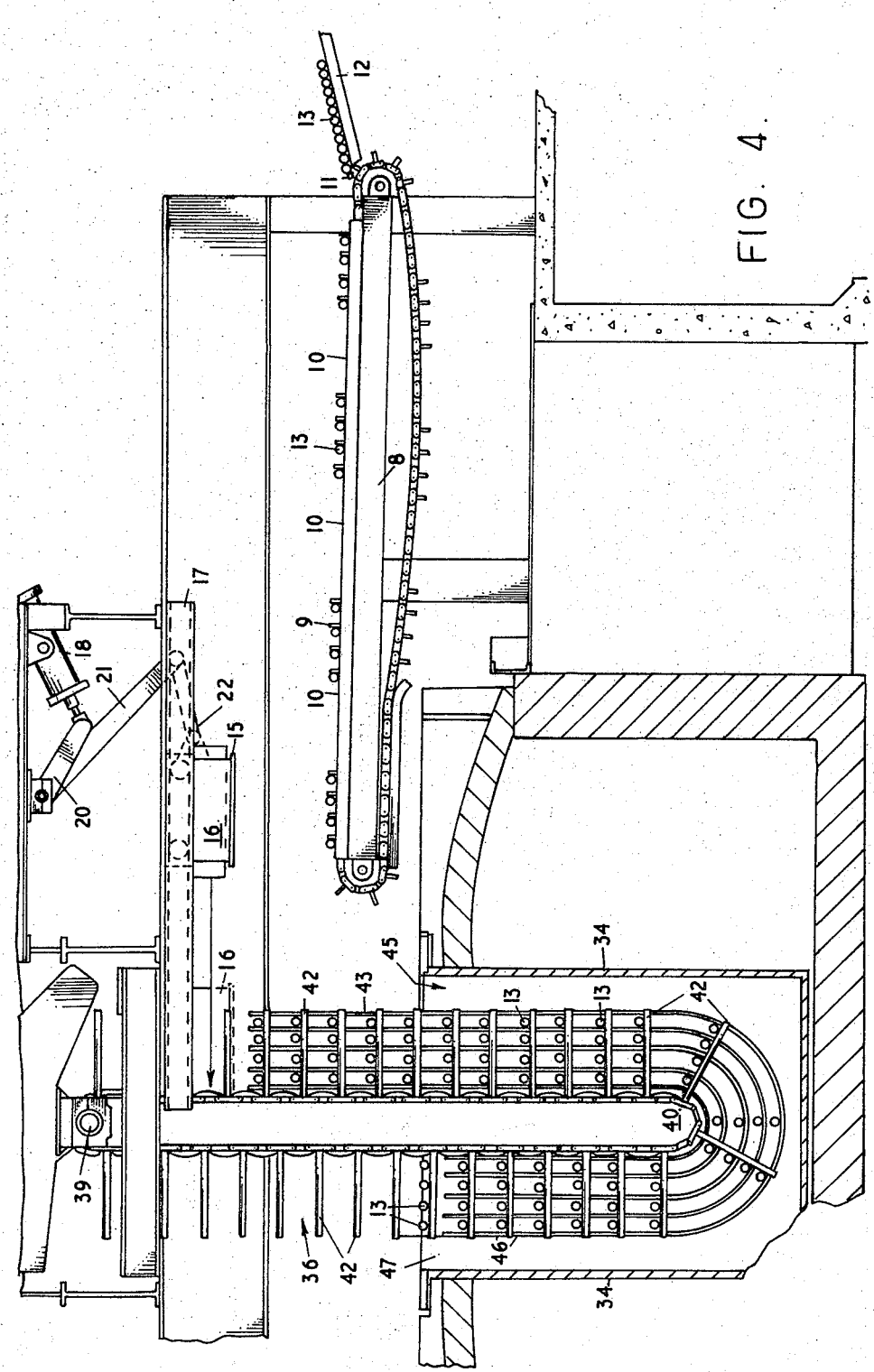

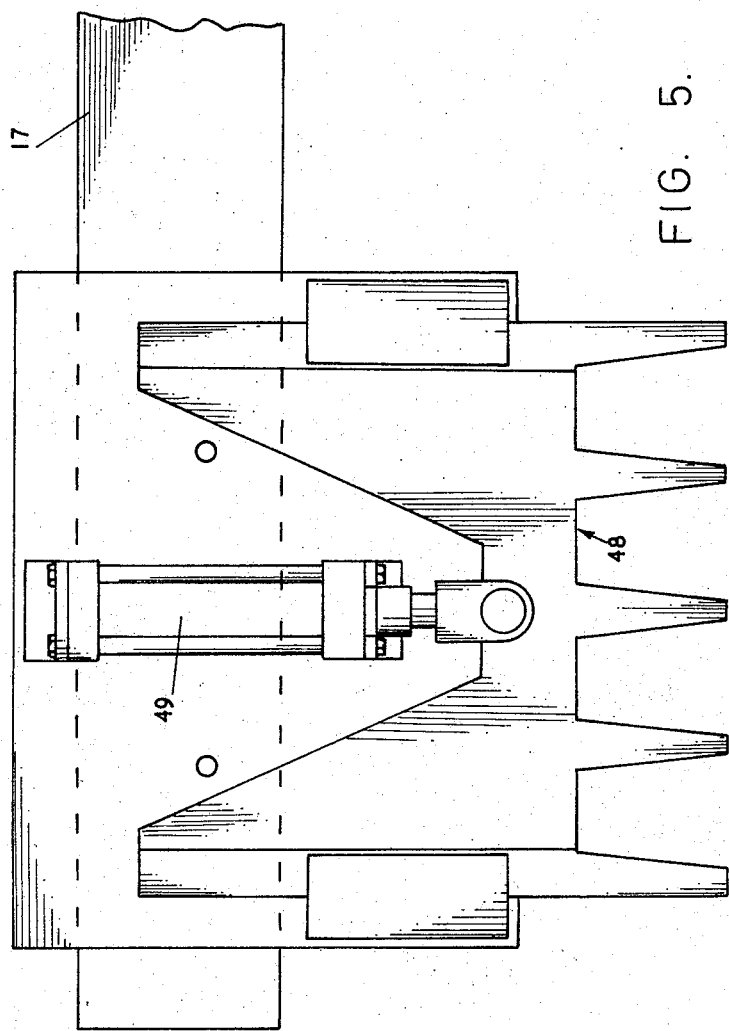

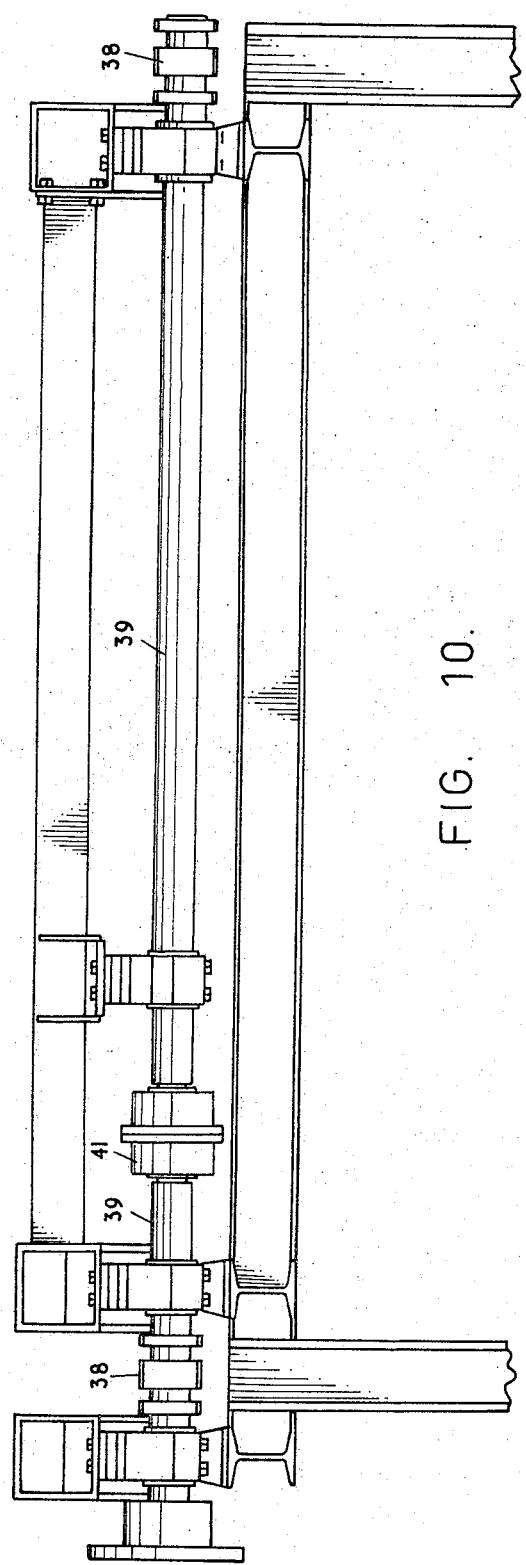

3,340,850
APPARATUS FOR CONTINUOUSLY CONVEYING TUBES THROUGH A HOT GALVANISING BATH
Leonard Tom Elliott, Dudley, New South Wales, Australia, assignor to Stewarts and Lloyds (Australia) Pty. Limited, Mayfield, New South Wales, Australia, a company of Victoria
Filed Jan. 7, 1965, Ser. No. 424,076
Claims priority, application Australia, Jan. 14, 1964, 39,736/64
10 Claims. (Cl. 118—423)

ABSTRACT OF THE DISCLOSURE

A tube galvanising apparatus having a tube immersion conveyor adapted to travel continuously and vertically through a galvanising bath. The immersion conveyor is arranged to receive tubes spaced apart in gangs from a pick-up conveyor at one side of the bath and discharge them at the other side of the bath in the same spaced formation.

---

This invention has been devised to provide an apparatus for continuously conveying tubes in spaced relationship through a hot galvanising bath automatically and in an accurately timed sequence.

One advantage resulting from the invention is that it is possible to secure a greater uniformity of zinc deposit than is economically possible with manually controlled apparatus as constructed hitherto. With the apparatus of this invention batches of tubes (hereinafter called gangs of tubes) are withdrawn from the galvanising bath in the same sequential order as they were fed into it and all gangs receive the same immersion time.

Another advantage resulting from the invention is that the apparatus will achieve a greater output in a given time than was possible with manually controlled apparatus as constructed hitherto and this is accomplished without speeding up or shortening the immersion period.

The apparatus comprises a pick-up conveyor located substantially horizontally externally of a bath and at right angles to the bath. This pick-up conveyor has fixed thereon equally spaced groups of equally spaced tube pick-up fingers arranged to pick up gangs of tubes from a delivery device and convey the tubes to a vertical, immersion conveyor arranged to travel vertically through the bath. This immersion conveyor has equally spaced arms projecting therefrom to receive the gangs of tubes. At least two groups of J guides located in juxtaposition to the arms of the immersion conveyor are arranged to form spaced tube guideways through the bath. Means mounted on a frame adjacent the immersion conveyor are adapted to lift and transfer in separate gangs in sequence, tubes from the pick-up conveyor to the immersion conveyor at the inlet side of the bath. Other means mounted on a support structure and located in juxtaposition to the outlet side of the bath are adapted to remove the gangs of tubes from the immersion conveyor. Actuating means are incorporated to operate the several conveyors, the lifting and transfer means and the tube removing means in timed sequence. A traverser which does not form part of this invention draws the galvanised gangs of tubes to conventional apparatus where surplus spelter is removed from the tubes.

One embodiment of the invention is described with reference to the annexed drawings wherein:

FIGURE 2 is a side elevation, and

FIGURE 3 is a plan of the means to lift gangs of tubes from the pick-up conveyor to the transfer means.

FIGURE 4 is a fragmentary end elevation, partly in section showing the general arrangement of the lifting and transfer means, the pick-up conveyor and one gang of J guides.

FIGURE 5 is a fragmentary end elevation of one of a pair of tube ejectors adapted to force tubes from the transfer means into the J guides.

FIGURE 10 is a side elevation partly in section of the immersion conveyor drive unit.

Figure 1:
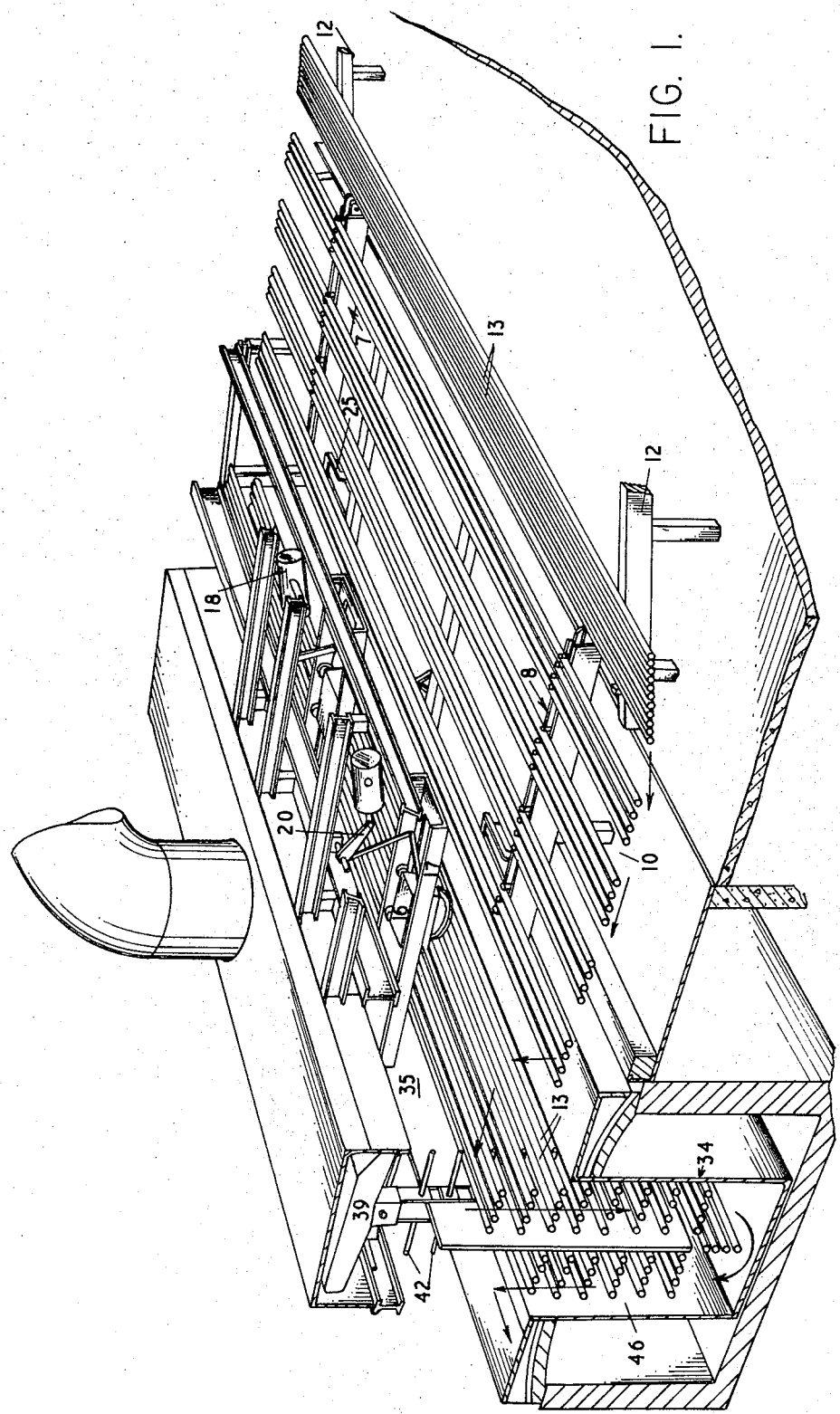
FIGURE 1 is a perspective view of the galvanising apparatus in vertical section from the inlet side of the bath, the J guides being omitted.

In this embodiment of the invention the tubes are mechanically handled in gangs of four. The pick-up conveyor comprises two units 7 and 8 mounted on a frame in parallel spaced relationship, each having equally spaced groups of equally spaced tube pick-up fingers 9 thereon. The pick-up fingers 9 on one conveyor unit, are aligned with those on the conveyor unit. The space 10 between the pick-up fingers is sufficient to freely accommodate a tube and the space between the groups of pick-up fingers and the speed at which the pick-up conveyor operates is determined to provide sufficient time for the tube lifting and transfer means to lift and transfer one gang of tubes and return to the lift position again to engage the next gang of tubes. At the pick-up end 11 of the conveyor units 7 and 8 an arrangement of ramps 12 guides tubes 13 deposited thereon to a position where they can be placed in gangs on conveyors 7 and 8 by the pick-up fingers 9. The pick-up conveyors 7 and 8 slope slightly upwardly to the delivery end.

At the delivery end of the pick-up conveyor 7–8, a pneumatic lifting unit 14—to be described—raises the tubes 13, one gang at a time in sequence, into contact with two electromagnets 15 mounted under two transfer carriages 16 on rails 17. A pair of pneumatic cylinders 18 are pivotally mounted on the apparatus support structure, one above each of the rails 17. The plunger rods of these cylinders 18 are connected, each to one arm 20 of a pair of bell-cranks fulcrummed on the support structure. The other arm 21 of each bell-crank is connected by a link 22 to the respective carriages 16. The pneumatic cylinders 18 are actuated to move the carriages 16, through the described linkage, from the tubes receiving position to a position where the tubes can be deposited in gangs on the respective arms of the vertical, immersion conveyors.

The pneumatic lifting unit 14, FIGURES 2 and 3, comprises a pair of grooved lift plates 23. The aligned pairs of grooves of the lift plates 23 are adapted to move under and accommodate gangs of tubes. The lift plates 23 are each connected by a linkage indicated generally at 24 and bellcranks 25 to an actuator rod 26, which in turn is connected for reciprocation, by linkage 27, to the plunger rod 28 of a pneumatic unit 29, pivotally mounted in brackets 30 in a sub-frame 31 mounted between the conveyors 7 and 8. The linkages 24 and bell-cranks 25 constitute parallelogram linkages for each lift plate 23 and cause the lift plates 23 to move in vertical planes. These lift plates 23 are actuated in a timed sequence by control means and limit switches indicated generally at 32. The sub-frame 31 incorporates additional supports 33 for the gangs of tubes on the conveyors 7 and 8.

Figure 9:
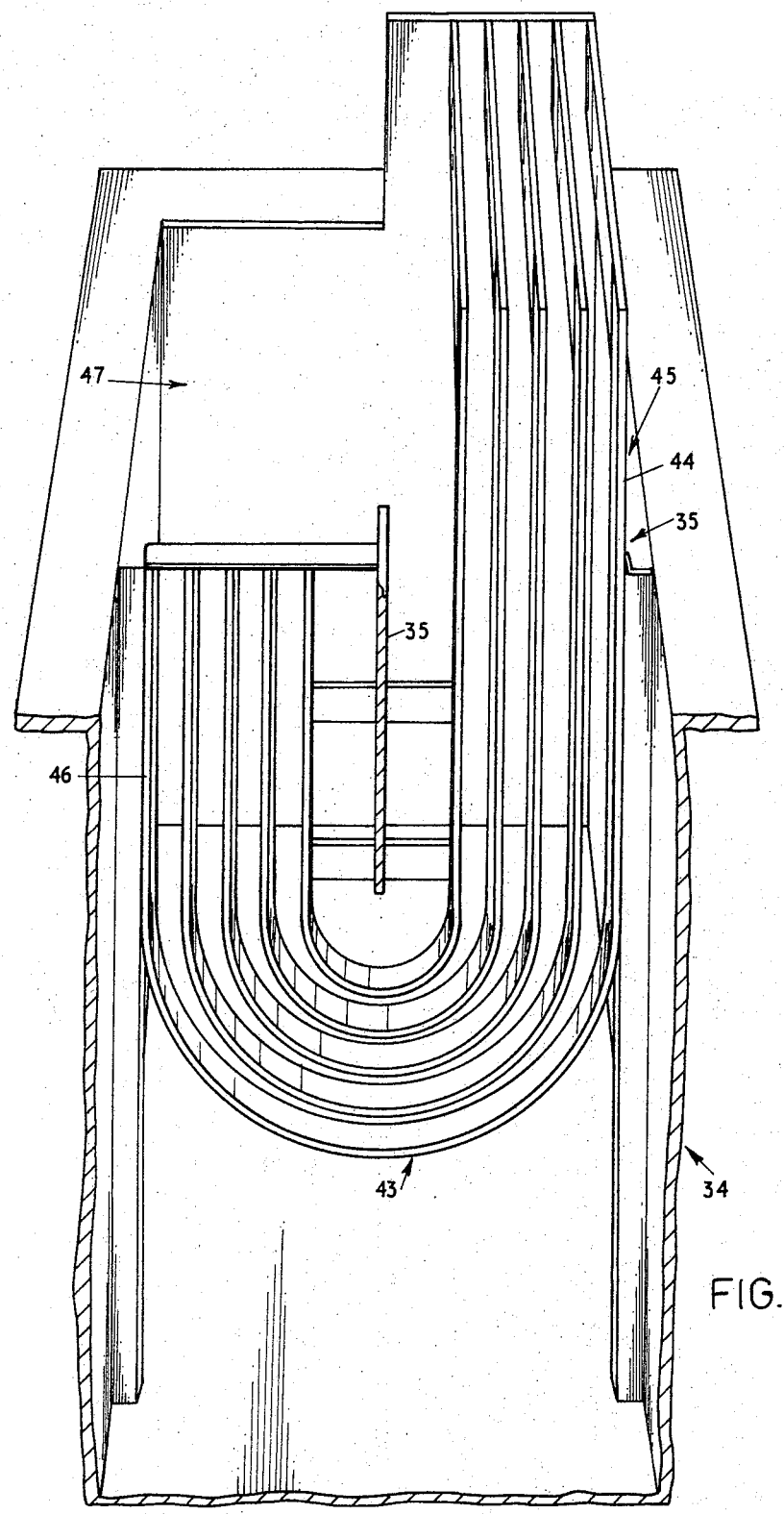
FIGURE 9 is a sectional perspective view of one set of J guides and part of the galvanising bath.

The galvanising tank 34 is partially divided longitudinally by a plate 35 (see FIGURES 1 and 9) which projects downwardly from above the tank to a position in the tank which provides ample clearance for tubes 13 on the vertical immersion conveyor—indicated at 36—to pass under it.

The immersion conveyor 36 consists of two chain conveyor units 37 constructed so that the relative movement of the links in their passage through the bath prevents the accumulation of dross thereon or the pick-up of spelter. The chains 37 are mounted on sprockets 38 on drive shaft 39 above the tank 34 and on chain return guides 40 in the tank 34. The drive shaft 39 runs in bearings supported in the support structure and is in two parts connected together by a gear muff-coupling 41 which permits relative adjustment of the chains. The chains have arms 42 projecting outwardly therefrom, the arms on one chain being angularly aligned with the arms on the other chain for the purpose which will be stated later. The arms 42 are each sufficiently long to carry a gang of tubes. The immersion conveyor unit juxtaposed the discharge end of the tank 34 does not extend into the tank to the same depth as the conveyor unit at the other end. This arrangement of the conveyor units provides that the tubes 13 enter the tank at a shallow angle which permits the free entry of molten zinc into the tubes. This angular arrangement also facilitates draining the coated tubes as they emerge from the bath.

Two groups of J guides 43 are mounted in the tank by brackets fixed to the plate 35; they are located in juxtaposition to the arms 42. The long limbs 44 of the J guides are on the inlet side 45 of the tank 35; they project above the tank to the position where the gangs of tubes 13 are deposited on the arms 42 from the transfer carriages 16. The short limbs 46 of the J guides terminate adjacent the outlet side 47 of the tank. Five J guides 43 constitute a group at the discharge end of the tank 34. They are spaced apart sufficiently to permit the free passage of one tube 13 in each space through the bath. At the rear end of the tank three guides only are required; they provide two passageways and accommodate two tubes in each.

The arrangement of the immersion conveyor units 37 is such that two arms 42—one on each chain unit 37—carry a gang of tubes 13 at a shallow angle down into the bath. When a gang of tubes reaches the lowermost position in the tank permitted by the J guides 43 they remain there until engaged in the same gang formation by the next following pair of arms 42 which carry them upwardly through the bath to the outlet side 47 of the tank.

To ensure that the gangs of tubes 13 are correctly aligned with and positively guided into the J guides 43, and to overcome residual magnetism in the electromagnets 15 when said electromagnets 15 are de-energised, a pair of fingered ejector plates 48 are each vertically slidably mounted on the outside of structural members which latter each form part of one of the rails on which the transfer carriages 16 move. The ejector plates 48 are located adjacent the transfer carriages 16 vertically above the position where tubes are deposited in gangs on the arms 42 of the immersion conveyors, and they are actuated by pneumatic units 49 also mounted on the structural members.

At the outlet side 47 of the tank 34 there is a pneumatic tube lifting unit 50 which is adapted to lift the high end of each gang of tubes 13 in sequence to a position where they can be held by an electromagnetic traverser 51. The pneumatic lifting unit 50 comprises a pair of vertical cylinders 52 mounted on the apparatus support structure. The plunger rod of each cylinder 52 is connected by coupling 53 to a rod 54 which is rotatable in the coupling. The rod 54 is of square section over a length which is a little longer than the stroke of the plunger. The square section part of the rod 54 is slidable in but not rotatable in a bush 55 which has a lever arm 56 projecting radially therefrom. The pair of lever arms 56 are connected by links 57 and by one of the connecting pins to a clevis head 58 on a plunger rod 59 of a pneumatic cylinder 60. This pneumatic cylinder 60 is pivotally mounted in brackets 61 on the apparatus support structure. It is adapted to turn the rods 54 through an angle of 90°.

Figure 6:
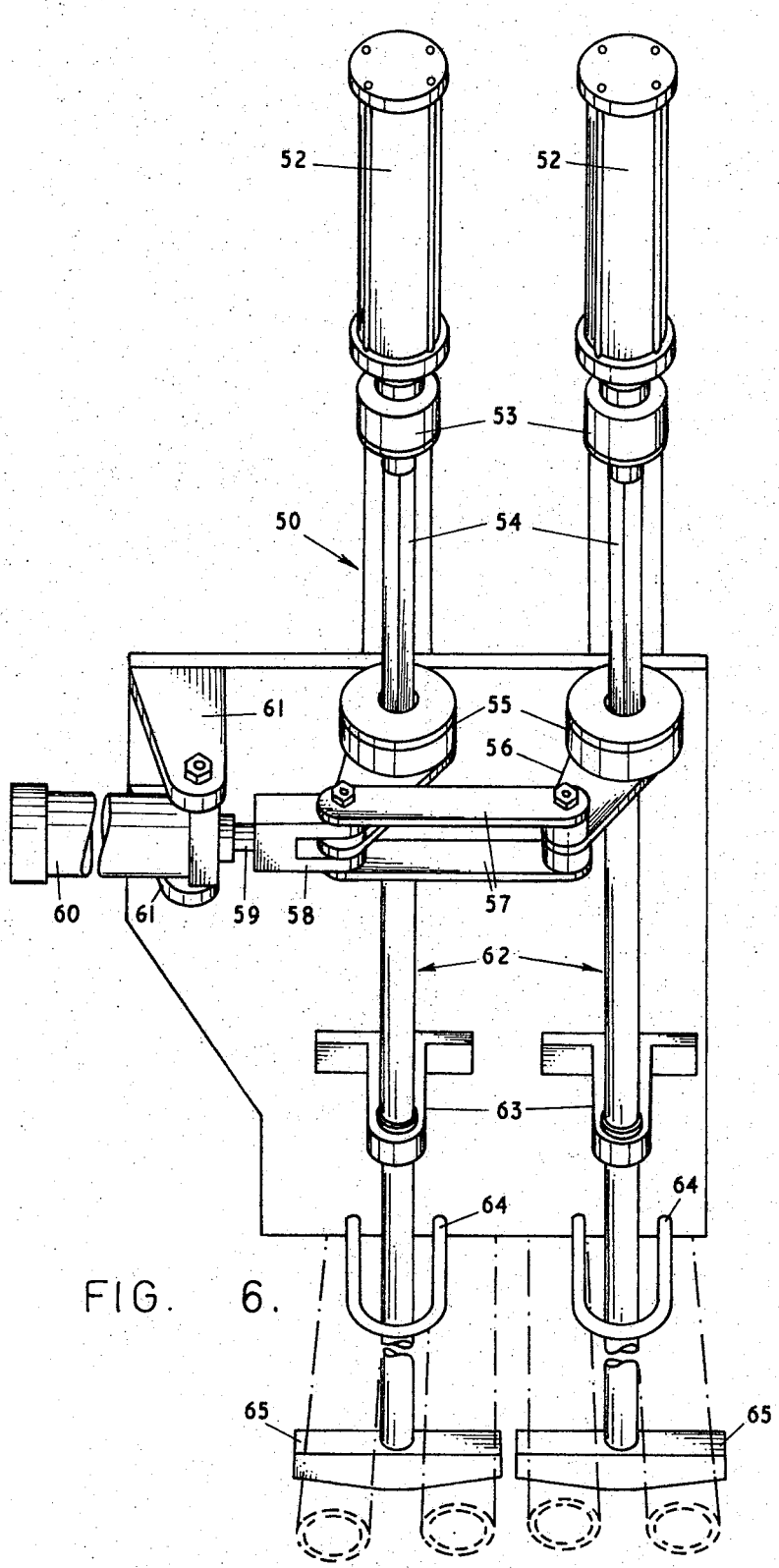
FIGURE 6 is a perspective view of lifting means which combine with other means shown in FIGURES 7 and 8 to remove the gangs of tubes from the vertical conveyor.
Figure 7:
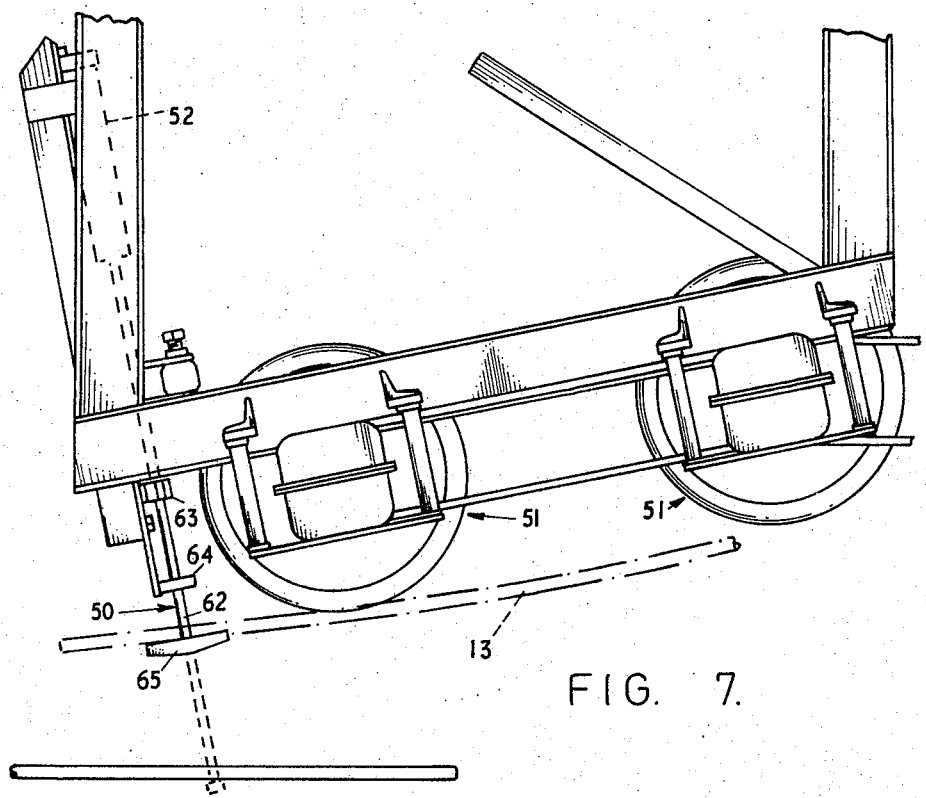
FIGURE 7 is a fragmentary elevation of the means which co-act with the means of FIGURE 6 to remove the gangs of tubes from the vertical conveyor.
Figure 8:
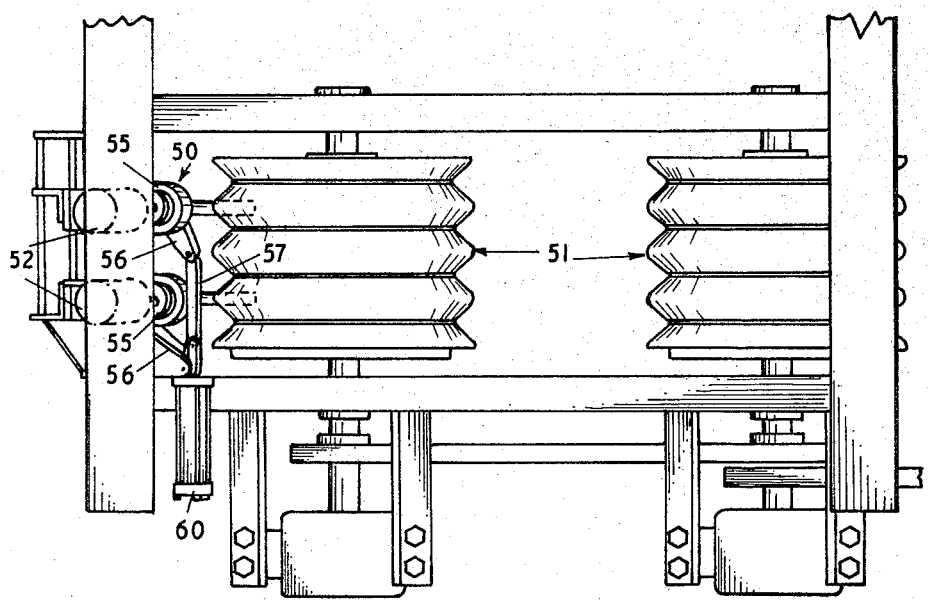
FIGURE 8 is a fragmentary plan of the means shown in FIGURE 7.

A cylindrical extension 62 of each rod 54 passes through a plummer block 63 and guides 64 and has a T bar 65 on its end. At the start of the lifting operation of a gang of tubes, the T bars 65 are above the spaces between two pairs of tubes 13 and are aligned to pass between the tubes. The T bars are lowered by the plunger rods of the pneumatic cylinders 52 and when below the tubes they are turned 90° to the position shown in FIGURE 6. The T bars are then raised to lift the high end of the tubes 13. When these ends are held by the electromagnetic traverser 51, the T bars 65 are turned back through 90° and retracted from the tubes. The electromagnetic traverser 51 and the means for removing surplus spelter from the tubes after they have been drawn from the tank, whilst forming part of the combined apparatus, are conventional.

Conventional means are incorporated to operate the several components of the apparatus here described in a timed sequence so that the operation of galvanising tubes can be carried out continuously automatically. The means to heat the galvanising tank are also conventional.

What I claim is:

1. Apparatus for continuously conveying tubes through a hot galvanising bath housed in a support structure and provided with heating means for the bath, said apparatus comprising a pick-up conveyor located substantially horizontally externally of the bath and at right angles to the bath, said pick-up conveyor having fixed thereon equally spaced groups of equally spaced tube pick-up fingers arranged to pick up gangs of tubes from a delivery device and convey said tubes to an immersion conveyor arranged to travel vertically through the bath, said immersion conveyor having equally spaced arms projecting therefrom to receive said gangs of tubes, at least two groups of J guides juxtaposed the arms of the immersion conveyor and arranged to form speed tube guideways through the bath, means mounted on a frame adjacent the immersion conveyor to lift and transfer in separate gangs in sequence tubes from the pick-up conveyor to the immersion conveyor at the inlet side of the bath, means mounted on a support structure and located in juxtaposition to the outlet side of the bath to remove the gangs of tubes from the immersion conveyor and means to operate the several conveyors, the lifting and transfer means and the tube removing means in a timed sequence.

2. Apparatus for continuously conveying tubes through a hot galvanising bath according to claim 1 wherein the pick-up conveyor comprises two conveyor units mounted on a frame in parallel spaced relationship.

3. Apparatus for continuously conveying tubes through a hot galvanising bath according to claim 1 wherein the immersion conveyor consists of two chain conveyor units mounted on a frame in parallel spaced relationship, the arms of one unit being angularly aligned with the arms of the other unit so that the gangs of tubes thereon are carried at a shallow angle down into and through the bath.

4. Apparatus for continuously conveying tubes through a hot galvanising bath according to claim 1 wherein the immersion conveyor unit juxtaposed the outlet end of the bath does not extend into the bath to the same depth as the other immersion conveyor unit.

5. Apparatus for continuously conveying tubes through a hot galvanising bath said apparatus comprising a pick-up conveyor located substantially horizontally externally of the bath and at right angles to the bath, said pick-up conveyor having fixed thereon equally spaced groups of equally spaced tube pick-up fingers arranged to pick up gangs of tubes from a delivery device and convey said tubes to an immersion conveyor arranged to travel vertically through the bath, said delivery device consisting of a ramp having one end located so that the conveyor pickup fingers can pick up tubes sequentially therefrom, said immersion conveyor consisting of two chain conveyor units mounted on a frame in parallel spaced relationship, each chain having equally spaced arms projecting therefrom to receive gangs of tubes, the arms on one unit being angularly aligned with the arms of the other unit, two groups of J guides juxtaposed the arms of the immersion conveyor and arranged to form tube guideways through the bath, means mounted on a frame adjacent the immersion conveyor to lift and transfer in separate gangs in sequence tubes from the pick-up conveyor to the immersion conveyor at the inlet side of the bath, means mounted on the support structure and located in juxtaposition to the outlet side of the bath to remove the gangs of tubes from the immersion conveyor and means to operate the several conveyors, the lifting and transfer means and tube removing means in a timed sequence.

6. Apparatus for continuously conveying tubes through a hot galvanising bath according to claim 5 wherein the means to lift the gangs of tubes from the pick-up conveyor consist of a pair of lift plates located between the pick-up conveyors and beneath gangs of tubes on said pick-up conveyors, said lift plates each being connected by a parallelogram linkage to an actuator rod, said actuator rod being connected by a linkage to the plunger rod of a pneumatic cylinder pivotally mounted in brackets fixed to a sub-frame located between the pick-up conveyors and control means fixed on the actuator rod for engagement with limit switches fixed on the sub-frame for actuating the lift plates in a timed sequence.

7. Apparatus for continuously conveying tubes through a hot galvanising bath according to claim 5, wherein the transfer means consists of a pair of carriages slidable horizontally on the support structure, an electro magnet on each carriage, and pneumatically operated plunger rods connected by link and lever means to the respective carriages and wherein the support structure has a pair of ejector plates vertically slidably mounted thereon, and also has pneumatic units mounted thereon for actuating the ejector plates, said ejector plates being located adjacent the transfer carriages vertically above the position where tubes are deposited on the immersion conveyor.

8. Apparatus for continuously conveying tubes through a hot galvanising bath according to claim 5 wherein the means to remove tubes in gangs from the immersion conveyor at the outlet side of the bath consist of a pair of pneumatically operated plunger rods each having a T head, said vertical plunger rods being connected as a pair by link and lever means to a pneumatically horizontally operated plunger rod, said vertical plunger rods being rotated through 90° by said horizontal plunger rod to permit the T heads to be located parallel to and at right angles to the tubes, the arrangement of the vertical plunger rods being such that when said T heads are parallel to the tubes they are moved downwardly below the tubes of said gangs of tubes, then turned at right angles to the tubes by said horizontal plunger rod, then raised to lift one end of a gang of tubes into engagement with transfer means, then returned parallel to the tubes and lowered ready for the next removal cycle.

9. Apparatus for continuously conveying tubes through a hot galvanising bath, said apparatus comprising a pick-up conveyor located substantially horizontally externally of the bath and at right angles to the bath, said pick-up conveyor having fixed thereon equally spaced groups of equally spaced tube pick-up fingers arranged to pick up gangs of tubes from a delivery device and convey said tubes to an immersion conveyor arranged to travel vertically through the bath, said delivery device consisting of a ramp having one end located so that the conveyor pick-up fingers can pick up tubes sequentially therefrom, said immersion conveyor consisting of two chain conveyor units mounted on a frame in parallel spaced relationship, each chain having equally spaced arms projecting therefrom to receive gangs of tubes, the arms on one unit being angularly aligned with the arms of the other unit, means to actuate the chain conveyors including a two piece drive shaft connected by a gear muff coupling which permits relative adjustment of the chains, two groups of guides juxtaposed the arms of the immersion conveyor and arranged to form tube guideways through the bath, said groups of J guides being mounted on a plate which partially divides the bath longitudinally and projects downwardly into the bath, means mounted on a frame adjacent the immersion conveyor to lift and transfer in separate gangs in sequence tubes from the pick-up conveyor to the immersion conveyor, said means consisting of a pair of lift plates located between the pick-up conveyors and beneath gangs of tubes on said pick-up conveyors, said lift plates each being connected by a parallelogram linkage to an actuator rod, said actuator rod being connected by a linkage to the plunger rod of a pneumatic cylinder pivotally mounted in brackets fixed to a sub-frame located between the pick-up conveyors and control means fixed on the actuator rod for engagement with limit switches fixed on the sub-frame for actuating the lift plates in a timed sequence, said transfer means consisting of a pair of carriages slidable horizontally on the support structure, electro magnets on each carriage, and pneumatically operated plunger connected by link and lever means to the respective carriages, said support structure having a pair of ejector plates vertically slidably mounted thereon and also having pneumatic units mounted thereon to actuate the ejector plates, means mounted on the support structure and located in juxtaposition to the outlet side of the bath to remove the gangs of tubes from the immersion conveyor and means to operate the several conveyors, the lifting and transfer means and the tube removing means in a timed sequence.

10. Apparatus for continuously conveying tubes through a hot galvanising bath according to claim 9, wherein the immersion conveyor unit juxtaposed the outlet end of the bath does not extend into the bath to the same depth as the other immersion conveyor unit.

No references cited.

CHARLES A. WILLMUTH, *Primary Examiner.*

R. I. SMITH, *Assistant Examiner.*